United States Patent [19]

Allen

[11] 4,004,147

[45] Jan. 18, 1977

[54] LOGGING SUBSURFACE FORMATIONS FOR POROSITY

[75] Inventor: Linus S. Allen, Dallas, Tex.

[73] Assignee: Mobil Oil Corporation, New York, N.Y.

[22] Filed: Sept. 24, 1975

[21] Appl. No.: 616,238

[52] U.S. Cl. .............................. 250/264; 250/262
[51] Int. Cl.² ........................................ G01V 5/00
[58] Field of Search ................... 250/262, 264, 270

[56] References Cited

UNITED STATES PATENTS

| | | | |
|---|---|---|---|
| 2,776,378 | 1/1957 | Youmans | 250/264 |
| 3,373,280 | 3/1968 | Mills, Jr. | 250/262 |
| 3,532,884 | 10/1970 | Dewan | 250/264 |
| 3,906,224 | 9/1975 | Scott et al. | 250/264 |

Primary Examiner—Archie R. Borchelt
Attorney, Agent, or Firm—C. A. Huggett; George W. Hager, Jr.

[57] ABSTRACT

A borehole logging tool includes a source of fast neutrons and two thermal neutron detectors. A count rate meter is connected to each thermal neutron detector. A ratio detector provides a first signal indicative of the ratio of the count rates of the two thermal neutron detectors. A first comparator provides a signal indicative predominantly of the macroscopic absorption cross section of the formation by combining both such ratio signal and the count rate from one of the thermal neutron detectors. A second comparator provides a signal indicative predominantly of the porosity of the formation by combining both such ratio signal and such macroscopic absorption cross-section signal.

18 Claims, 3 Drawing Figures

LOGGING SUBSURFACE FORMATIONS FOR POROSITY

BACKGROUND OF THE INVENTION

This invention relates to neutron-neutron well logging and more particularly to an improved method of and system for determining the porosity of subsurface formations surrounding a borehole.

In such neutron-neutron logging, a fast neutron source irradiates the formations surrounding the borehole. The resulting secondary radiation is preferably measured by thermal neutron detectors axially spaced from such source within the borehole. The basic principles of such neutron-neutron logging have been described in an article entitled "Dual-Spaced Neutron Logging For Porosity" by L. S. Allen, C. W. Tittle, W. R. Mills, and R. L. Caldwell in GEOPHYSICS, Vol. 32, No. 1, pp. 60–68 (February, 1967). Briefly, a two-group neutron diffusion theory describes such resulting secondary radiation, these two groups being epithermal neutrons and thermal neutrons.

For a point neutron source in an infinite, homogeneous medium, this secondary radiation can be represented as follows:

$$\Phi_t(r) = \frac{QL_t^2}{4\pi D_t(L_e^2 - L_t^2)} \left( \frac{e^{-r/L_e}}{r} - \frac{e^{-r/L_t}}{r} \right) \quad (1)$$

where, $\Phi_t$ is the thermal neutron flux,
r is the radial distance measured from the source,
Q is the point neutron source strength,
D is the thermal neutron diffusion coefficient,
$L_e$ is the epithermal neutron parameter (slowing down length), and
$L_t$ is the thermal neutron parameter (diffusion length).

The epithermal neutron parameter $L_e$ of the formation principally is determined by the concentration of hydrogen in the formation, and hydrogen content is related to the porosity of the formation. The thermal neutron parameter $L_t$ of the formation also is related to porosity but is strongly affected by the total macroscopic absorption cross section of the formation, that is, the macroscopic absorption cross sections of both the rock matrix and fluids within the formation. Firstly, the macroscopic absorption cross section of the formation fluid is affected by the salinity of the fluid and is significantly reduced when the pore spaces of the formation contain salt water rather than oil. The chlorine present in the salt water has a large macroscopic absorption cross section for thermal neutrons and, consequently, reduces the number of thermal neutrons returning to the borehole as secondary radiation. At the same time, the absorption of thermal neutrons by the chlorine effects an increase in the number of thermal neutron capture gamma rays returning to the borehole as secondary radiation. Secondly, the macroscopic absorption cross section of the formation rock matrix is affected by certain trace elements common in shales and other sedimentary rocks. For example, boron and gadolinium absorb thermal neutrons strongly to reduce the number of thermal neutrons returning to the borehole as secondary radiation. Consequently, secondary radiation resulting from irradiation of the formation surrounding a borehole by means of a fast neutron source is affected by both thermal and epithermal neutron parameters and is an indication of both the porosity and the macroscopic absorption cross section of the formation.

In the process of measuring such secondary radiation by thermal neutron detectors within the borehole, certain conditions within the borehole itself adversely affect the thermal neutron flux measurements made by thermal neutron detectors. These include borehole size, type of fluid in the borehole, and eccentricity of location of the logging tool in the borehole. By taking the ratio of the thermal neutron fluxes detected by two spaced-apart thermal neutron detectors, a measurement is made of the secondary radiation from the formation that is only slightly affected by such adverse borehole effects. Consequently, such a ratio of the thermal neutron fluxes detected at two such spaceda-part positions within the borehole is predominantly indicative of the epithermal neutron $L_e$ and thermal neutron $L_t$ parameters of the formation, that is, the porosity and macroscopic absorption cross section of the formation.

This ratio of the thermal neutron fluxes is to a greater extent dependent upon the epithermal neutron parameter than the thermal neutron parameter. As a result, such a ratio has been utilized in the past as an apparent indication of the porosity of the formation having been logged. However, to utilize such a ratio of the outputs of two thermal neutron detectors as a correct indication of formation porosity, the varying effects of the total formation macroscopic absorption cross section must be compensated for. In U.S. Pat. No. 3,491,238 to L. S. Allen there is described a technique and system for determining a correct porosity measurement by essentially eliminating the macroscopic absorption cross-section effect on the thermal neutron flux measurements of each two spaced-apart thermal neutron detectors. As noted in such patent, at large source-to-detector spacings, the thermal neutron flux is governed by the epithermal neutron parameter because this parameter is larger than the thermal neutron parameter. Therefore, by locating two thermal neutron detectors at realtively large distances from the neutron source, and measuring the ratio of the detector outputs, the thermal neutron parameter effect is eliminated from the thermal neutron flux ratio measured by these detectors. The ratio of the outputs from the two detectors is therefore unaffected by the formation macroscopic absorption cross section and is a correct indication of formation porosity.

Many conventional borehole logging systems, however, employ spaced-apart thermal neutron detectors that are not located sufficiently far from the neutron source so as to eliminate the effects of variations in the thermal neutron flux measurements of the thermal neutron detectors. Consequently, the ratio of the outputs of the thermal neutron detectors is only an apparent indication of the porosity of the formation. It is, therefore, an object of the present invention to provide for a new and improved technique and system by which the formation macroscopic absorption cross-section effect on the thermal neutron flux measurements can be compensated for to provide for a porosity measurement that is a correct indication of the porosity of the formation.

SUMMARY OF THE INVENTION

In accordance with the present invention there is disclosed a new and improved technique and system for determining the correct porosity of a formation being logged by a borehole logging system employing two spaced-apart thermal neutron detectors that are located sufficiently close to the neutron source so that the thermal neutron flux measurements by the thermal neutron detectors of the secondary radiation are affected by both the formation porosity and macroscopic absorption cross section.

More particularly, a source of fast neutrons irradiates the formation surrounding a borehole. The secondary radiation from the formation is measured at two spaced-apart positions within the borehole, such positions being sufficiently close to the neutron source so that both epithermal neutron and thermal neutron parameters affect the secondary radiation measurements. A ratio is determined of the secondary radiations measured at each of such two spaced-apart positions within the borehole, such ratio being affected by both the porosity and the macroscopic absorption cross section of the formation. This ratio is, firstly, combined with the secondary radiation measured at one of the two spaced-apart positions in accordance with a known relationship between porosity and thermal neutron flux to produce a first signal indicative of the macroscopic absorption cross section of the formation. This ratio is, secondly, combined with such first signal in accordance with a known relationship between porosity and macroscopic absorption cross section to produce a second signal indicative of the correct porosity of the formation.

DESCRIPTION OF THE PREFERRED EMBODIMENT

The present invention is directed toward a method and system of neutron-neutron logging for porosity.

Figure 1:
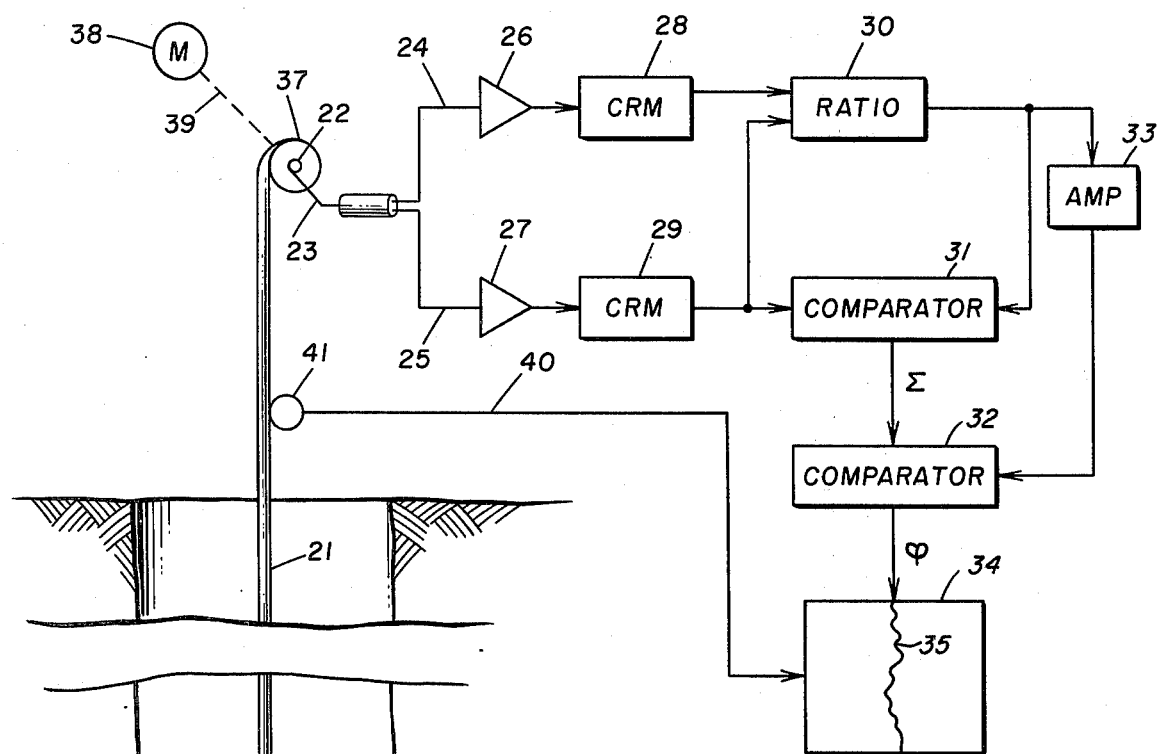
FIG. 1 illustrates a borehole logging system for carrying out the present invention.
Figure 1:
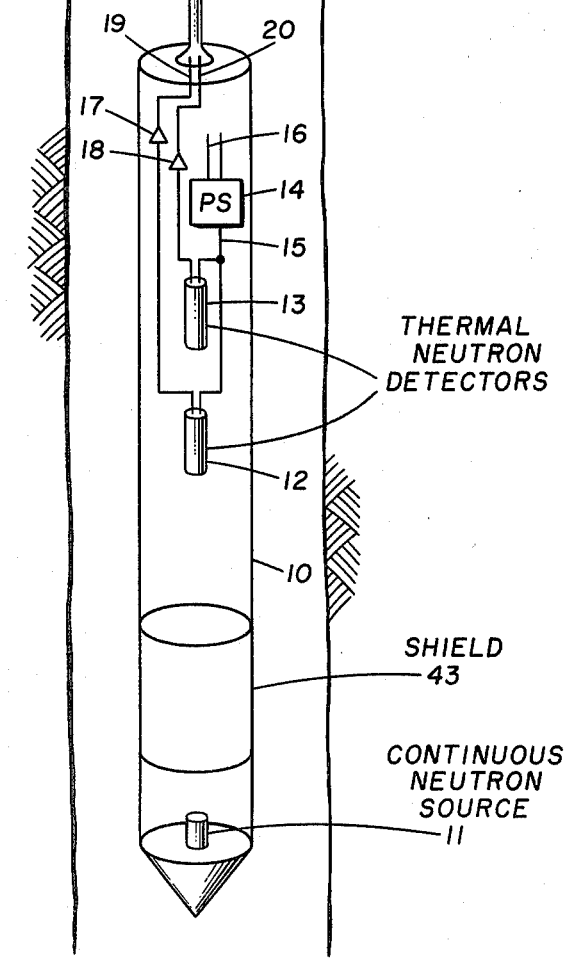

Referring to FIG. 1, a borehole logging tool 10 has a steady-state neutron source 11 for irradiating the formations and two spaced-apart thermal neutron detectors 12 and 13. The neutron source 11 preferably is a steady-state Am-Be fast neutron source with an average energy of about 4 million electron volts. The thermal neutron detectors 12 and 13 may be proportional counters of the type disclosed in U.S. Pat. No. 3,102,198 to Bonner and filled with six atmospheres of helium-3 gas. Detectors of this type are very sensitive to thermal neutrons. A shield 43 protects the thermal neutron detectors 12 and 13 from directed neutron radiation from the neutron source 11. A power supply 14 is located within the borehole tool 10 for supplying power to the thermal neutron detectors 12 and 13 by way of conductor 15. Current is applied to the power supply 14 from the surface by way of conductors 16. The outputs of the thermal neutron detectors 12 and 13 are applied to amplifiers 17 and 18 which in turn are coupled to conductors 19 and 20 included in the cable 21. At the surface, the outputs from conductors 19 and 20 are applied by way of the slip rings 22 and rushes 23 to conductors 24 and 25 which extend to amplifiers 26 and 27. The outputs of amplifiers 26 and 27 are applied to the thermal neutron count rate meters 28 and 29.

The outputs of the thermal neutron count rate meters 28 and 29 are applied to the ratio detector 30 which may be of a conventional type as disclosed on pages 338 and 339 in ELECTRONIC ANALOG COMPUTERS, Granino A. Korn and Theresa M. McGraw-Hill Book Company, Inc., New York, 1956. By taking the ratio of the outputs from the two count rate meters, certain borehole conditions that have affected the thermal neutron flux mesurements of the formation parameters are eliminated. These borehole conditions include the borehole size, type of fluid in the borehole, an eccentricity of location of the logging tool in the borehole. Consequently, the ratio of the outputs from the count rate meters is independent of such borehole conditions and is therefore predominantly indicative of the epithermal neutron and thermal neutron parameters of the formation, namely, the porosity and macroscopic absorption cross section of the formation.

Figure 2:
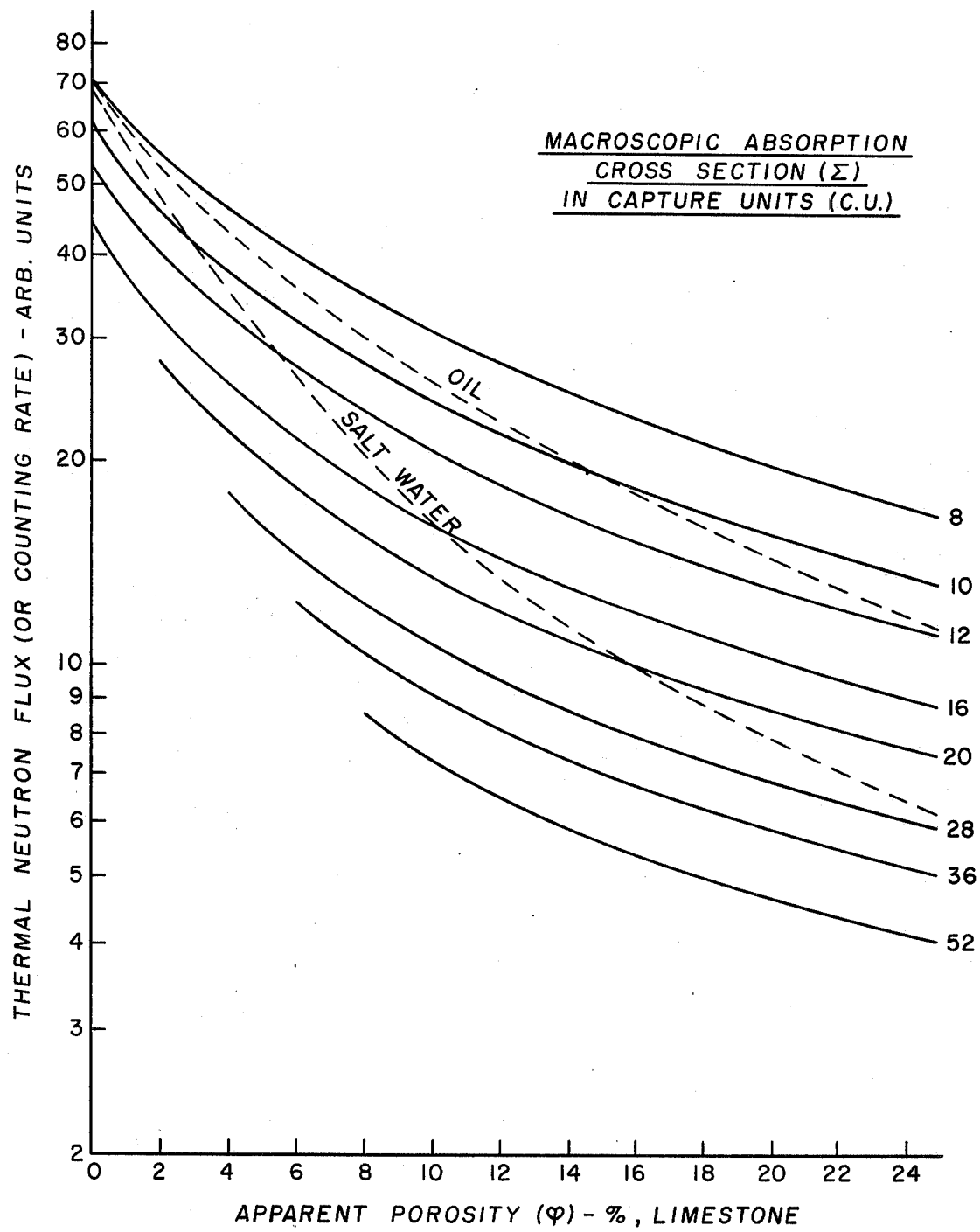
FIGS. 2 and 3 illustrate, in graphical form, characteristics of example subsurface formations as might be encountered when logging with the borehole system of FIG. 1.

The ratio detector output is applied as one input to a comparator 31. The other input to comparator 31 is supplied by one of the count rate meters, for example, count rate meter 29. The output of this comparator 31 is a signal indicative of the total macroscopic absorption cross section of the formation, $\Sigma_{formation}$. This comparison can best be understood in view of the following considerations taken in conjunction with FIG. 2. The epithermal neutron parameter $L_e$ is principally determined by the concentration of hydrogen in the formation and is affected only slightly by changes in formation fluid salinity. The thermal neutron parameter $L_t$, on the other hand, changes rapidly with changes in formation fluid salinity. Hence, in accordance with Equation (1), the thermal neutron flux is significantly changed when the pore space of the formation matrix contains salt water rather than hydrocarbons. This effect of formation fluid on the thermal neutron flux is illustrated in FIG. 2 for the example of a limestone formation traversed by an 8-inch diameter, fresh-water-filled borehole.

The thermal neutron flux is represented as being detected by a thermal neutron detector spaced 63 cm. from the source. Solid curves define a known relationship between the thermal neutron flux, thermal neutron flux ratio, and macroscopic absorption cross sections ($\Sigma$) for the formation and its fluids. Two particular cases are illustrated by dashed curves. The upper dashed curve corresponds to a limestone formation having $\Sigma_{rock} = 8$ capture units (c.u.) which is saturated with an oil having $\Sigma_{fluid} = 22$ c.u. The lower dashed curve corresponds to the same limestone formation ($\Sigma_{rock} = 8$ c.u.), with the pore space being saturated with a brine containing 150,000 ppm NaCl and having $\Sigma_{fluid} = 78$ c.u. Points lying between these two curves, determined by a simultaneous flux and flux ratio measurement, clearly define a unique value of macroscopic absorption cross section and a corresponding intermediate case of oil saturation. Consequently, the macroscopic absorption cross section of the formation may be determined in accordance with a known relationship between the measured values of the thermal neutron flux measurement from the count rate meter 29 and the ratio of the thermal neutron flux measurements from the count rate meters 28 and 29.

It will be apparent to those skilled in the art that the comparator 31 can be calibrated in terms of such a known relationship that may be either theoretically or experimentally determined. Preferably, the comparator 31 includes at least one operational amplifier with inputs supplied by the thermal neutron flux and ratio measurements from the count rate meter 29 and ratio detector 30, respectively. Feedback and biasing resistors may be selected by calibrating the output signal from the operational amplifier in accordance with a known relationship between such inputs. In this type configuration, the comparator 31 provides an output signal indicative of the macroscopic absorption cross section of the formation and its fluids.

Figure 3:
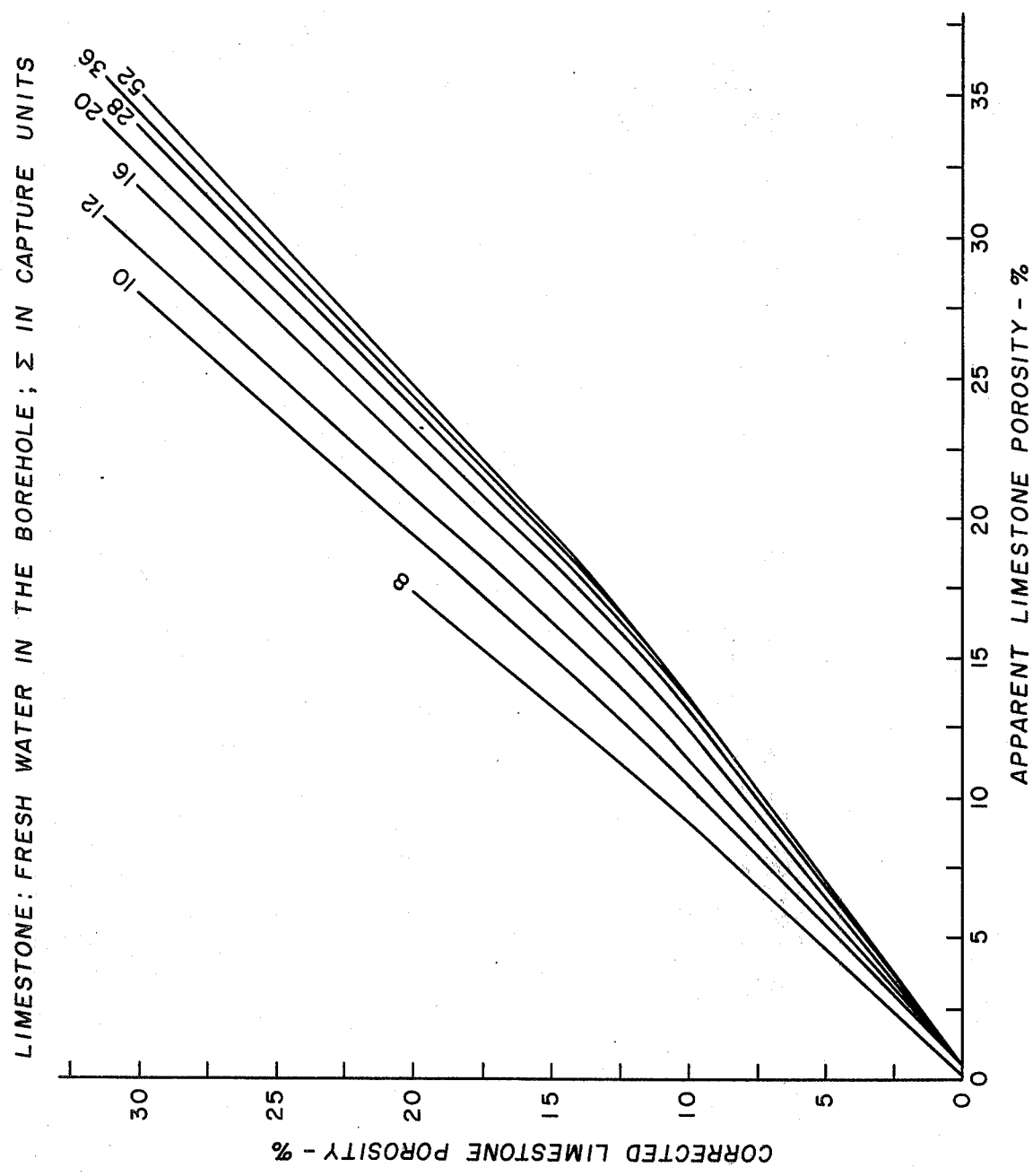

This signal from comparator 31 is applied as one input to another comparator 32. A second input to the comparator 32 is supplied by the ratio detector 30 through amplifier 33. The output of this comparator 32 is a signal indicative of formation porosity. This comparison can best be understood in view of the following considerations taken in conjunction with FIG. 3 where there is illustrated in graphical form a series of known correction curves useful in compensating thermal neutron flux ratio measurements for the effects of formation macroscopic absorption cross section to provide for a correct indication for formation porosity. Similar correction curves can also be derived either experimentally or theoretically for other type subsurface formations such as dolomite and sandstone. Experimentally, a correction curve for a given type formation is derived by logging the formation and plotting the measured porosity against known values for the porosity and macroscopic absorption cross sections throughout the depth of the formation. Such known values may be taken from either core samples or from existing logs known to be accurate. Theoretically, such a correction curve can be obtained by deriving a model of the porosity log based on the two-group neutron diffusion theory as described in conjunction with the expression of Equation (1) above.

Preferably, the comparator 32 includes an operational amplifier, with the amplified signal from ratio detector 30 and amplifier 33 applied to one input and the signal from the comparator 31 applied to the other input. Feedback and biasing resistors are selected for calibrating the output signal from the operational amplifier in accordance with a known relationship between such inputs. In this type configuration, the comparator 32 provides an output signal indicative of formation porosity.

Coupled to the output of comparator 32 is the recorder 34. Such a recorder may preferably be a continuous trace recorder having its chart driven continuously in correlation with depth by way of mechanical connection 40 and measuring reel 41 coupled to cable 21. Cable 21 is wound and unwound upon drum 37 driven by motor 38 and mechanical connection 39 to move the borehole tool through the borehole. The porosity-indicative signal from comparator 32 is recorded as trace 35 as the logging tool is continuously moved through the borehole.

In the foregoing-described preferred embodiment, the detectors 12 and 13 are thermal neutron detectors utilized for detecting that secondary radiation that represents predominantly the thermal neutron parameters of the formation being logged. In an alternate embodiment, this same nature of secondary radiation may be detected by the use of gamma-ray detectors that measure the thermal neutron capture gamma rays emitted by the formation. It is therefore to be understood that within the scope of the appended claims the measurement of that secondary radiation representing predominantly the thermal neutron parameters of the formation may be carried out by either the detection of thermal neutrons or thermal neutron capture gamma rays.

I claim:

1. A method of logging the formations traversed by a borehole for porosity, comprising the steps of:
   a. locating a source of fast neutrons within the borehole to irradiate the formations with neutrons,
   b. measuring the thermal neutron flux of the secondary radiation from the formation at two spaced-apart positions within said borehole,
   c. producing a ratio of the thermal neutron flux measured at each of said two positions,
   d. combining said ratio with the thermal neutron flux measured at one of said two spaced-apart positions in accordance with a known relationship to produce a first signal indicative of the macroscopic absorption cross section of the formation, and
   e. combining said ratio with said first signal in accordance with a known relationship to produce a second signal indicative of the porosity of the formation.

2. The method of claim 1 further including the step of recording said first signal indicating the macroscopic absorption cross section of the formation in correlation with the depth of logging in said borehole.

3. The method of claim 1 further including the step of recording said second signal indicating the porosity of the formation in correlation with the depth of logging in said borehole.

4. The method of claim 1 wherein the step of measuring secondary radiation comprises the producing of count rates of the thermal neutrons arriving at each of said spaced-apart positions from the formation being logged.

5. The method of claim 1 wherein the step of measuring secondary radiation comprises the producing of count rates of the thermal neutron capture gamma rays arriving at each of said spaced-apart positions from the formation being logged.

6. In a method of logging a borehole for formation porosity including the steps of irradiating a formation with fast neutrons, measuring the thermal neutron flux of the secondary radiation from the formation at two spaced-apart positions in the borehole and producing a ratio of the thermal neutron flux measured at each of the two positions in the borehole as an indication of the apparent porosity of the formation, the improvement of correcting such apparent porosity for the effects of the macroscopic absorption cross section of the formation on the thermal neutron flux measurements, comprising the steps of:
   a. comparing the ratio of thermal neutron fluxes to one of the thermal neutron fluxes in accordance with a known relationship between porosity and thermal neutron flux to produce a first signal indicative of macroscopic absorption cross section of the logged formation, and
   b. comparing the ratio of the thermal neutron fluxes with said first signal in accordance with a known relationship between porosity and macroscopic absorption cross section to provide a second signal indicative of the porosity of the logged formation.

7. A system for logging the formations traversed by a borehole, comprising:
   a. a borehole tool,
   b. means for moving said borehole tool through a borehole,
   c. a source of fast neutrons located within said borehole tool for irradiating the formations surrounding the borehole with neutrons,
   d. a pair of thermal neutron flux detectors located within said borehole tool at spaced-apart positions from said source to detect secondary radiation from the formations surrounding the borehole,
   e. means for producing a ratio of the thermal neutron fluxes measured by said pair of detectors,
   f. means for combining said ratio with the thermal neutron flux measured at one of said pair of detectors in accordance with a known relationship to produce a first signal indicative of the macroscopic absorption cross section of the formation, and
   a. means for combining said ratio with said first signal in accordance with a known relationship to produce a second signal indicative of the porosity of the formation.

8. The system of claim 7 wherein said secondary radiation detectors measure thermal neutrons arriving at each of said spaced-apart positions from the formation being logged.

9. The system of claim 7 wherein said secondary radiation detectors measure thermal neutron capture gamma rays arriving at each of said spaced-apart positions from the formatons being logged.

10. The system of claim 7 further including a recording for producing a continuous trace of said second signal indicating the porosity of the formation in correlation with the depth of logging in said borehole.

11. The system of claim 7 wherein said means for combining said ratio with the thermal neutron flux measured at one of said detectors includes a comparator biased in accordance with a known relationship between porosity and thermal neutron flux to thereby produce said first signal.

12. The system of claim 11 wherein said comparator includes at least one operational amplifier.

13. The system of claim 7 wherein said means for combining said ratio with said first signal includes a comparator biased in accordance with a known relationship between porosity and macroscopic absorption cross section to thereby produce said second signal.

14. The system of claim 13 wherein said comparator includes at least one operational amplifier.

15. In a borehole logging system having a source of fast neutrons located within a borehole, a pair of thermal neutron flux detectors located axially at spaced-apart positions from such source, a pair of count rate meters for counting the thermal neutrons detected by such thermal neutron flux detectors, and a ratio detector for comparing the count rates from the count rate meters to provide a signal indicative of the ratio of the measured thermal neturon fluxes, the improvement comprising:
   a. a first comparator for comparing the output of the ratio detector with the output of one of the count rate meters to provide a first signal indicative of the macroscopic absorption cross section of the formation, and
   b. a second comparator for comparing the output of the ratio detector with the output of said first comparator to provide a second signal indicative of the porosity of the formation.

16. The system of claim 15 further including a recorder for producing a continuous trace of said second signal indicating the porosity of the formation in correlation with the depth of logging in the borehole.

17. The system of claim 15 wherein said first comparator includes at least one operational amplifier biased in accordance with a known relationship between porosity and thermal neutron flux.

18. The system of claim 15 wherein said second comparator includes at least one operational amplifier biased in accordance with a known relationship between porosity and macroscopic absorption cross section.

* * * * *